United States Patent
Muraoka et al.

(10) Patent No.: US 11,312,144 B2
(45) Date of Patent: Apr. 26, 2022

(54) INKJET PRINTING APPARATUS

(71) Applicant: CANON KABUSHIKI KAISHA, Tokyo (JP)

(72) Inventors: Chiaki Muraoka, Kawaguchi (JP); Yuji Tamaru, Tokyo (JP); Kazumasa Matsushita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/835,081

(22) Filed: Mar. 30, 2020

(65) Prior Publication Data
US 2020/0316952 A1 Oct. 8, 2020

(30) Foreign Application Priority Data
Apr. 5, 2019 (JP) .............................. JP2019-072551

(51) Int. Cl.
| | |
|---|---|
| *B41J 2/175* | (2006.01) |
| *B41J 2/21* | (2006.01) |
| *C09D 11/322* | (2014.01) |
| *C09D 11/328* | (2014.01) |

(52) U.S. Cl.
CPC ....... *B41J 2/17523* (2013.01); *B41J 2/17596* (2013.01); *B41J 2/21* (2013.01); *C09D 11/322* (2013.01); *C09D 11/328* (2013.01)

(58) Field of Classification Search
CPC ...... B41J 2/175; B41J 2/17509; B41J 2/1752; B41J 2/17523; B41J 2/17536; B41J 2/17543; B41J 2/17546; B41J 2/17553; B41J 2/17596; B41J 2/21; B41J 29/02; B41J 29/13; C09D 11/322; C09D 11/328
See application file for complete search history.

(56) References Cited

U.S. PATENT DOCUMENTS

| | | | |
|---|---|---|---|
| 8,991,971 B2 | 3/2015 | Suzuki et al. | |
| 2001/0045976 A1* | 11/2001 | Ara ...................... | B41J 2/17596 347/85 |
| 2007/0229631 A1* | 10/2007 | Yano .................... | B41J 2/17509 347/87 |
| 2013/0169720 A1 | 7/2013 | Nakamura et al. | |
| 2014/0104349 A1* | 4/2014 | Kimura ................ | B41J 2/17509 347/85 |

(Continued)

FOREIGN PATENT DOCUMENTS

| | | |
|---|---|---|
| CN | 103158363 A | 6/2013 |
| JP | 2000015828 A | 1/2000 |

(Continued)

*Primary Examiner* — Anh T Vo
(74) *Attorney, Agent, or Firm* — Canon U.S.A., Inc. IP Division (57) ABSTRACT

An inkjet printing apparatus includes a discharge head that discharges ink, and a housing that contains the discharge head, wherein the housing contains a first ink storage member and a second ink storage member that each store ink, and the ink is supplied from each of the first ink storage member and the second ink storage member to the discharge head, wherein the first ink storage member is an ink cartridge not having an ink refilling port for enabling ink refilling by opening a stopper member, and detachable from the inkjet printing apparatus, and wherein the second ink storage member has the ink refilling port.

20 Claims, 7 Drawing Sheets

(56) References Cited

U.S. PATENT DOCUMENTS

| | | | |
|---|---|---|---|
| 2015/0085034 A1* | 3/2015 | Aruga | C09D 11/38 |
| | | | 347/93 |
| 2016/0207318 A1* | 7/2016 | Shirono | B41J 29/13 |
| 2016/0221348 A1 | 8/2016 | Nakamura | |
| 2018/0126744 A1 | 5/2018 | Moriyama et al. | |
| 2018/0290455 A1 | 10/2018 | Tanaka et al. | |

FOREIGN PATENT DOCUMENTS

| | | |
|---|---|---|
| JP | 2002200773 A | 7/2002 |
| JP | 2017081173 A | 5/2017 |
| JP | 2018069696 A | 5/2018 |

* cited by examiner

INKJET PRINTING APPARATUS

BACKGROUND OF THE INVENTION

Field of the Invention

The present invention relates to an inkjet printing apparatus.

Description of the Related Art

An inkjet printing apparatus performs printing by discharging ink. One type of inkjet printing apparatus includes a discharge head that discharges ink, and an ink storage member that stores ink to be supplied to the discharge head. Japanese Patent Application Laid-Open No. 2018-69696 discusses an inkjet printing apparatus that enables a user to refill an ink storage member with ink from an ink bottle. The ink is consumed by being discharged.

In an inkjet printing apparatus such as the one discussed in Japanese Patent Application Laid-Open No. 2018-69696, it is easy to increase the capacity of an ink bottle for ink refilling, and the capacity of an ink storage member to which ink is added. Therefore, as compared with an ordinary inkjet printing apparatus that uses an ink cartridge as an ink storage member, the frequency of ink refilling (replacement in the case of an ink cartridge) is reduced and thus usability is easily improved.

SUMMARY OF THE INVENTION

According to an aspect of the present invention, an inkjet printing apparatus includes a discharge head that discharges ink, and a housing that contains the discharge head, wherein the housing contains a first ink storage member and a second ink storage member that each store ink, and the ink is supplied from each of the first ink storage member and the second ink storage member to the discharge head, wherein the first ink storage member is an ink cartridge not having an ink refilling port for enabling ink refilling by opening a stopper member, and detachable from the inkjet printing apparatus, and wherein the second ink storage member has the ink refilling port.

Further features of the present invention will become apparent from the following description of exemplary embodiments with reference to the attached drawings.

DESCRIPTION OF THE EMBODIMENTS

According to a study made by the inventors, the inventors have found such an issue that evaporation of moisture in ink from an ink storage member of an ink-refilling type tends to progress. The ink storage member capable of being refilled with ink has an ink refilling port for ink refilling. Normally, the ink refilling port is closed with a stopper member, but evaporation of the moisture in the ink from the stopper member and the periphery thereof can progress. Further, in general, the ink storage member capable of being refilled with ink has a large capacity. Therefore, this type of ink storage member is often left unused for a long time without being refilled with ink. In such a case, the amount of evaporation of moisture from the ink storage member increases. If the evaporation of the moisture from the ink in the ink storage member thus progresses, the density (e.g., color material density) of the stored ink increases. If such ink is supplied to a discharge head and then discharged (printing is performed), the desired darkness or color tone of a printed image or character may not be achieved.

Therefore, the present invention is directed to an inkjet printing apparatus that can inhibit a change in darkness and color tone of a printed image or character due to evaporation of moisture in ink, even in a case where an ink storage member capable of being refilled with ink is used to improve usability.

Figure 1A:
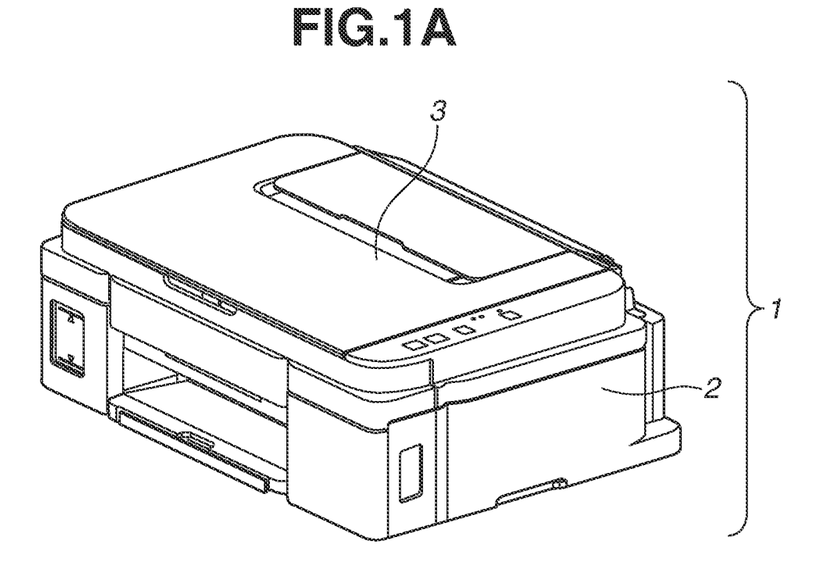
FIGS. 1A and 1B are perspective views of an inkjet printing apparatus.
Figure 1B:
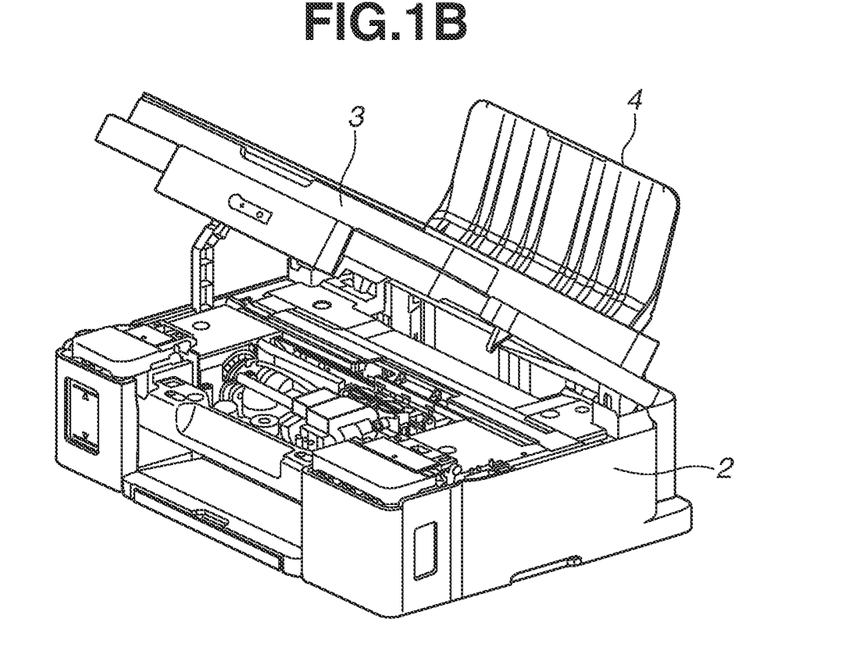

An inkjet printing apparatus according to an exemplary embodiment of the present invention will be described below with reference to the drawings. FIGS. 1A and 1B each illustrate an example of a perspective view of the inkjet printing apparatus according to the present exemplary embodiment. As illustrated in FIG. 1A, an inkjet printing apparatus 1 has a housing 2 and a cover member 3 provided on a top surface of the housing 2. FIG. 1B is a diagram illustrating a state where the cover member 3 of the inkjet printing apparatus 1 is opened so that the inside of the housing 2 is visible. The housing 2 is substantially shaped like a rectangular parallelepiped, and includes a sheet feeding tray 4 at a rear part. FIG. 1B illustrates a state where the sheet feeding tray 4 is extended from the housing 2.

Figure 2:
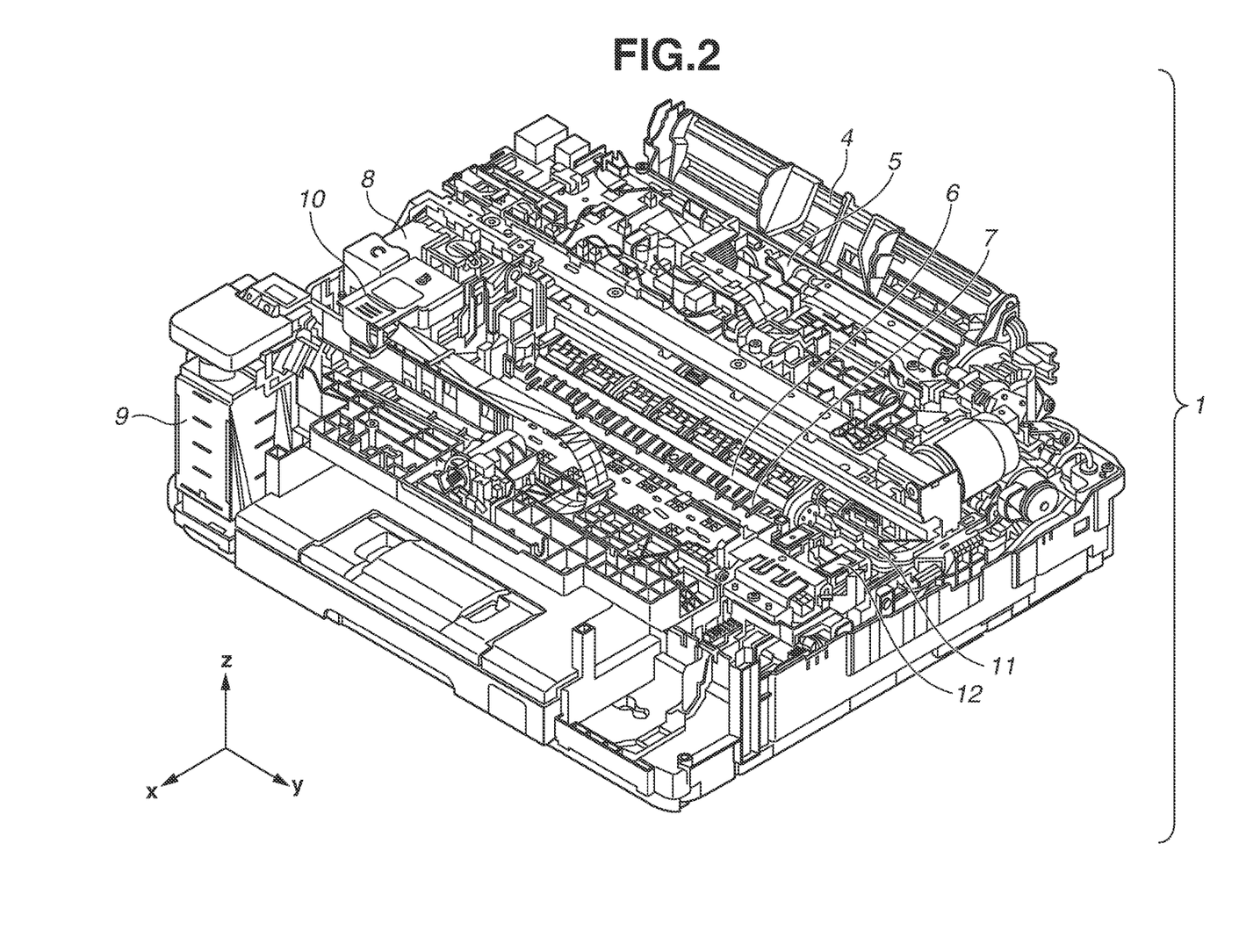
FIG. 2 is a perspective view of the inkjet printing apparatus.

FIG. 2 is a diagram illustrating the inside of the housing 2 of the inkjet printing apparatus 1 in FIG. 1B, in a state where the inside of the housing 2 is viewed more easily by removing an outer wall of the housing 2. The housing 2 includes the sheet feeding tray 4 on the rear side, as also illustrated in FIGS. 1A and 1B. A printing medium such as a sheet of paper is to be placed on the sheet feeding tray 4. The housing 2 contains a first ink storage member 8 and a second ink storage member 9. Further, in the example illustrated here, a third ink storage member 10 is provided inside the housing 2. Ink is supplied from the second ink storage member 9 to the third ink storage member 10. The first ink storage member 8 and the third ink storage member 10 are each provided with a discharge head (not illustrated in FIG. 2) at a part lower in a gravitational direction. The ink is supplied from each of the first ink storage member 8 and the third ink storage member 10 to the corresponding discharge head connected thereto. The gravitational direction in the present specification is a z direction in FIG. 2, and refers to a gravitational direction at the time of using the inkjet printing apparatus 1. The discharge head is provided with a discharge port for ink discharge, and an energy generating element that generates energy for the discharge. The discharge head discharges the ink from the discharge port, while reciprocally moving in a y direction in FIG. 2.

The printing medium placed on the sheet feeding tray 4 is sent by a sheet feeding roller 5 and a conveyance roller 6 in an x direction that is a frontward direction, and then supported by a platen 7 upon arriving at the platen 7. The printing medium supported by the platen 7 is placed at a position facing the discharge head. In this state, the ink is discharged from the discharge head to the printing medium. The discharged ink lands on the printing medium, so that an image is recorded on the printing medium.

The ink adheres to a discharge port surface where the discharge port of the discharge head is open. Therefore, the discharge port surface can be cleaned by recovery members such as a wiper 11 and a cap 12 that are provided inside the housing 2.

Figure 3A:
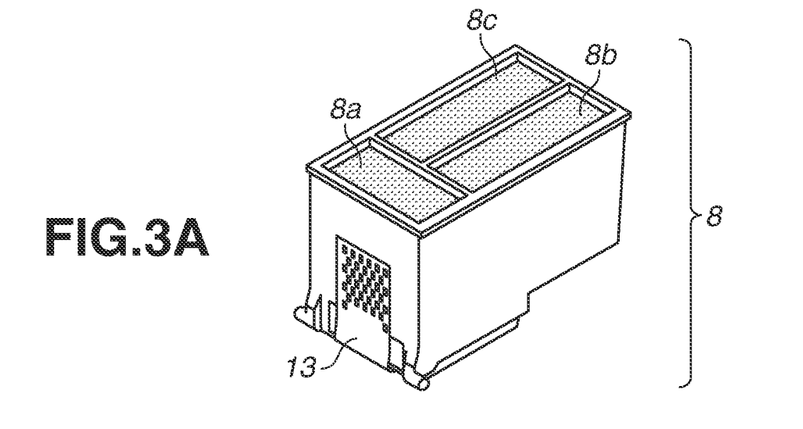
FIGS. 3A and 3B are diagrams illustrating a first ink storage member.
Figure 3B:
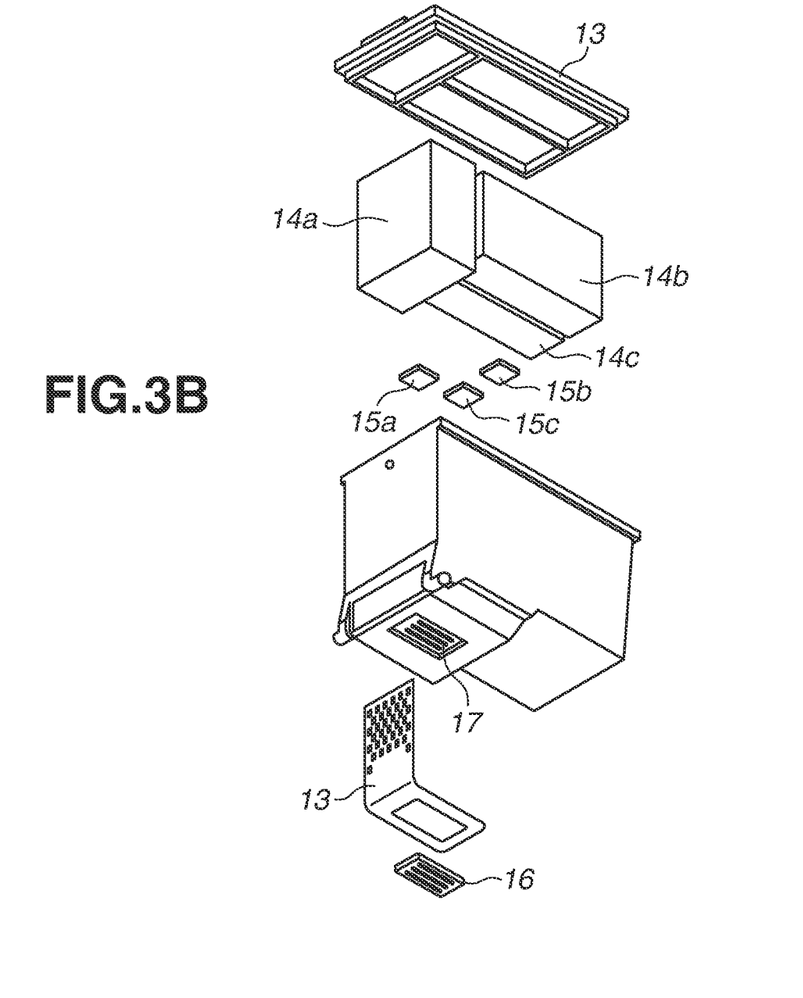

Next, the first ink storage member 8 will be described. The first ink storage member 8 is provided inside the housing 2. Here, an example will be described in which the first ink storage member 8 stores color ink of cyan, magenta, and yellow colors. FIGS. 3A and 3B each illustrate an enlarged view of the first ink storage member 8. FIG. 3A illustrates a state where a lid of the first ink storage member 8 is removed. An ink storage portion 8a stores the ink of cyan, an ink storage portion 8b stores the ink of magenta, and an ink storage portion 8c stores the ink of yellow. Further, the first ink storage member 8 has an electrical wiring member 13 for supplying power from outside to the discharge head.

FIG. 3B is an exploded view of the first ink storage member 8, and illustrates a state where the first ink storage member 8 is viewed from an angle different from that in FIG. 3A. Ink absorbing members 14a, 14b, and 14c are disposed in the ink storage portions 8a, 8b, and 8c, respectively, of the first ink storage member 8. The ink absorbing members 14a, 14b, and 14c are sponge-like members, and each hold the ink. Filters 15a, 15b, and 15c are each disposed at a lower part of the corresponding one of the ink storage portions 8a, 8b, and 8c in the gravitational direction. The discharge head 16 is provided at a lower part of the first ink storage member 8 in the gravitational direction. The discharge head 16 has the energy generating element and the discharge port, and is disposed on a support member 17. In the example illustrated in FIGS. 3A and 3B, the discharge head 16 has a discharge port array corresponding to the above-described three colors. The discharge head 16 of this example may also be referred to as a printing element substrate. The discharge head 16 is bonded to the first ink storage member 8 via the support member 17 to be integral with the first ink storage member 8. The discharge head 16 is driven by the power supplied from the electrical wiring member 13. The first ink storage member 8 is an ink cartridge not having an ink refilling port for ink refilling from the outside by a user and a stopper member for closing the ink refilling port, and detachable alone from the inkjet printing apparatus 1.

Figure 4A:
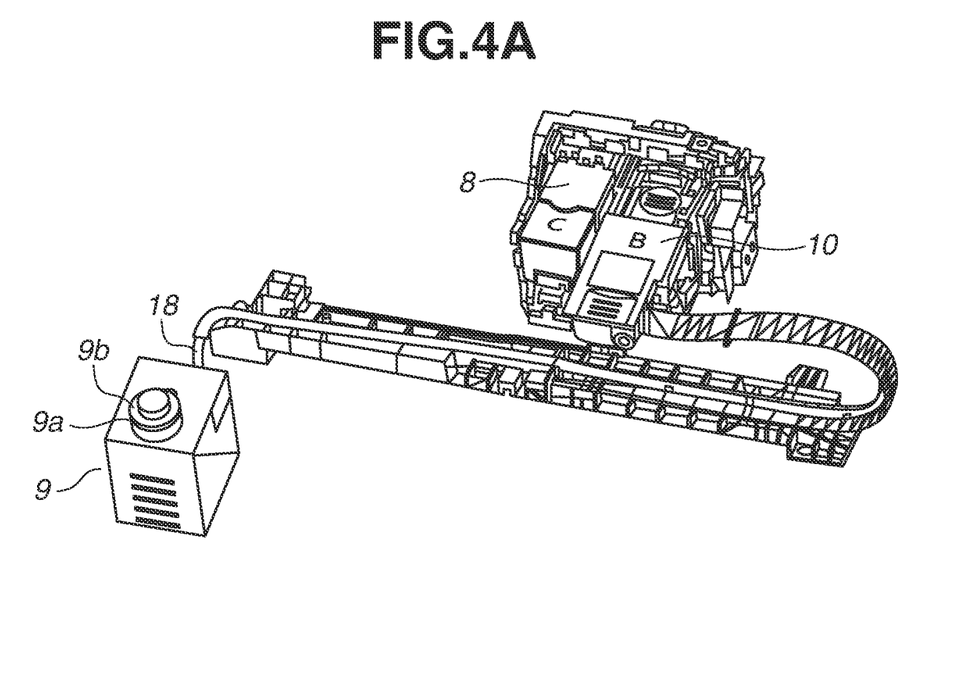
FIGS. 4A and 4B are diagrams illustrating the first ink storage member, as well as second and third ink storage members.
Figure 4B:
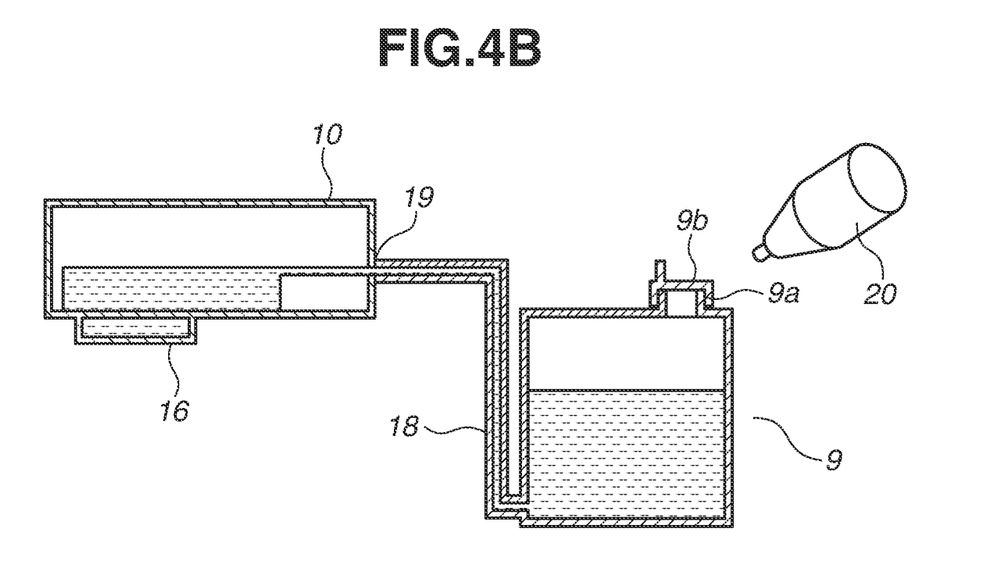

Next, the second ink storage member 9 will be described. The second ink storage member 9 is provided inside the housing 2, as with the first ink storage member 8. However, while the first ink storage member 8 does not have an ink refilling port for enabling ink refilling and a stopper member, the second ink storage member 9 has an ink refilling port for enabling ink refilling and a stopper member. FIGS. 4A and 4B illustrate the second ink storage member 9 and a system for supplying the ink to the second ink storage member 9. FIG. 4A illustrates the first ink storage member 8 and the third ink storage member 10, in addition to the second ink storage member 9. FIG. 4B schematically illustrates the second ink storage member 9 and the third ink storage member 10. The second ink storage member 9 is an ink tank that has an ink refilling port 9a for enabling ink refilling, as described above. The ink refilling port 9a is closed with a stopper member 9b. The stopper member 9b is formed of, for example, rubber. A user opens the ink refilling port 9a by opening the stopper member 9b, and inserts an ink bottle 20 into the opened ink refilling port 9a. The ink bottle 20 stores ink, and the ink is supplied from the ink bottle 20 to the second ink storage member 9. The second ink storage member 9 is thus refilled with the external color ink.

The second ink storage member 9 is connected to the third ink storage member 10 at a connection port 19 by a tube 18, as illustrated in FIGS. 4A and 4B. The ink stored in the second ink storage member 9 is supplied to the third ink storage member 10 via the tube 18. Here, a case where the second ink storage member 9 and the third ink storage member 10 each store black ink is illustrated as an example. The third ink storage member 10 is not partitioned into three rooms, and has only one room and one corresponding filter. Otherwise, basically, the third ink storage member 10 has a configuration similar to that of the above-described first ink storage member 8. In other words, the discharge head 16 integral with the third ink storage member 10 is provided at a part lower of the third ink storage member 10 in the gravitational direction. The inside of the discharge head 16 connects to the third ink storage member 10, and discharges the ink supplied from the third ink storage member 10.

The first ink storage member 8 provided inside the housing 2 is an ink cartridge not having an ink refilling port for enabling ink refilling by opening a stopper member, and detachable from the inkjet printing apparatus 1. In contrast, the second ink storage member 9 similarly provided inside the housing 2 is an ink storage member having an ink refilling port for enabling refilling of the second ink storage member 9 with ink.

The first ink storage member 8 stores, for example, color ink (ink of colors such as yellow, cyan, and magenta) that is not frequently used. The amount of consumption of such ink is small in many cases, and thus it is not necessary to provide an ink refilling port in the first ink storage member 8. Therefore, a change in darkness and color tone of a printed image or character due to evaporation of moisture from the ink refilling port can be inhibited. In addition, because the first ink storage member 8 is an ink cartridge detachable from the inkjet printing apparatus 1, it is also possible to inhibit progress of evaporation of moisture that occurs when the stored ink is left unused for a long time.

On the other hand, the second ink storage member 9 stores, for example, frequently-used black ink (ink of black color). The amount of consumption of such ink is large, and thus the ink refilling port is provided to enable ink refilling, so that usability can be improved.

In other words, because the inkjet printing apparatus 1 has the first ink storage member 8 and the second ink storage member 9 described above, there is provided such a configuration that refilling with a certain type of ink is enabled, while evaporation of moisture from other types of ink does not easily occur. In other words, the usability of ink refilling is improved, and a change in darkness and color tone of a printed image or character due to evaporation of moisture is inhibited, in the inkjet printing apparatus 1 as a whole.

The ink stored in each of the first ink storage member 8 and the second ink storage member 9 is not determined based on the use frequency alone. This will be described in detail below.

In the present exemplary embodiment, the first ink storage member 8 and the second ink storage member 9 are provided inside the housing 2. For example, if the second ink storage member 9 having the ink refilling port is provided outside the housing 2, such a configuration leads to an increase in the size of the entire inkjet printing apparatus 1, so that usability is impaired. Moreover, if the second ink storage member 9 is provided outside the housing 2, a distance for supplying the ink from the second ink storage member 9 to the discharge head 16 increases. The increase in the distance for supplying the ink leads to easy evaporation of moisture from the ink, and thus affects an image to be printed.

Desirably, the first ink storage member 8 does not have a tube or joint from the first ink storage member 8 to the discharge head 16 in order to inhibit the evaporation of moisture from the ink. The evaporation of the moisture not only affects an image to be printed, but also leads to ink clogging of the discharge head 16 due to ink adhesion. However, even if such a situation occurs, the first ink storage member 8 can be removed from the inkjet printing apparatus 1 to be individually replaced, because the first ink storage member 8 is an ink cartridge.

The first ink storage member 8 is an ink cartridge. Therefore, desirably, for example, the first ink storage member 8 can be removed from the inkjet printing apparatus 1, so that printing can be performed by using only the ink stored in the second ink storage member 9 having the refilling port. In the above-described example, the second ink storage member 9 stores the black ink. In this case, if the first ink storage member 8 is removed and recording is performed without the first ink storage member 8, the inkjet printing apparatus 1 can be used as a printing apparatus that prints a monochrome image using the black ink. In such a case, it is desirable that another member (a dummy member) different from the first ink storage member 8 be disposed in an area where the first ink storage member 8 has been disposed, in the inkjet printing apparatus 1.

Figure 5:
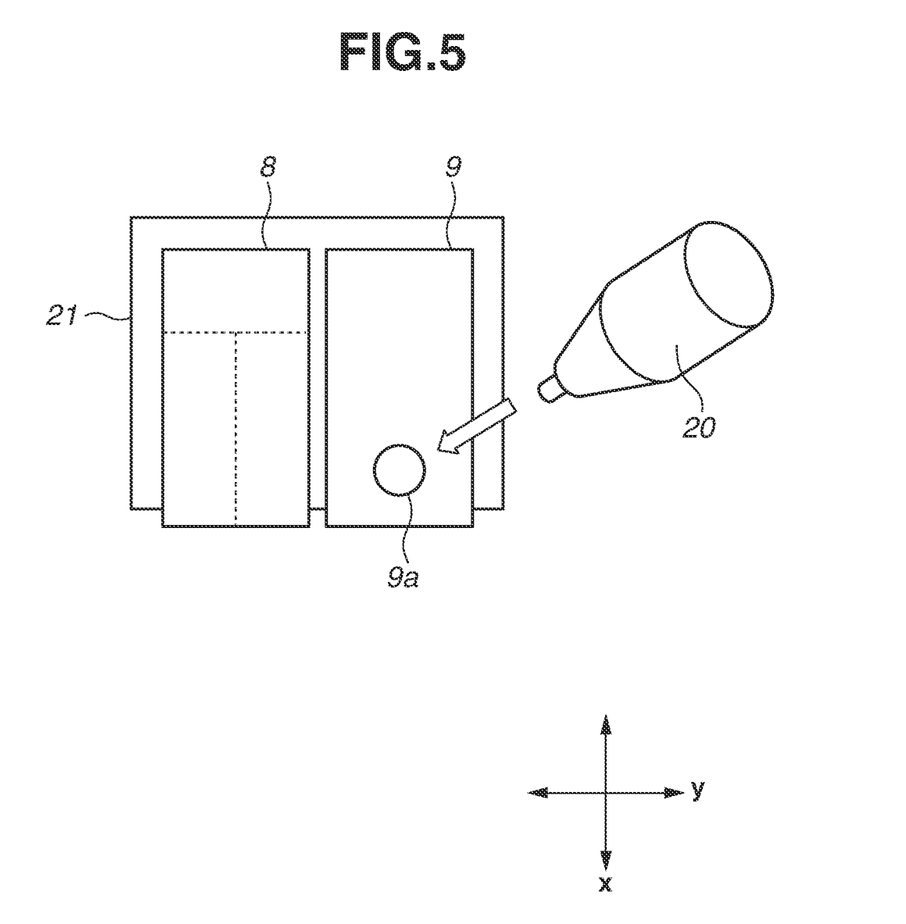
FIG. 5 is a diagram illustrating the first ink storage member and the second ink storage member.

The member that supplies the ink to the third ink storage member 10 having the discharge head 16 via the tube 18 is described as the second ink storage member 9, but the second ink storage member 9 is not limited to such a member. For example, it is possible to provide the second ink storage member 9 as an ink cartridge, without providing the third ink storage member 10. FIG. 5 is an enlarged view of the first ink storage member 8 and the second ink storage member 9 disposed inside the housing 2 of the inkjet printing apparatus 1, as viewed from above in the gravitational direction. The first ink storage member 8 and the second ink storage member 9 are provided on a carriage 21, and each have the discharge head 16 at a part lower in the gravitational direction. The first ink storage member 8 and the second ink storage member 9 each discharge the ink, while moving on the carriage 21 in a y direction. In this configuration, the inkjet printing apparatus 1 does not have the third ink storage member 10, and the first ink storage member 8 and the second ink storage member 9 are both ink cartridges. However, the second ink storage member 9 has the ink refilling port (the ink refilling port 9*a*) for enabling ink refilling from the ink bottle 20 by opening the stopper member, whereas the first ink storage member 8 does not have such a port. The inkjet printing apparatus thus configured can also inhibit a change in darkness and color tone of a printed image or character due to evaporation of moisture, while improving usability. Further, in this configuration, a place to be accessed by the user in each of these storage members when the ink runs out is a place on the carriage 21, and the respective places are adjacent to each other. Therefore, this configuration easily improves usability, and also reduces the size of the inkjet printing apparatus. However, because the second ink storage member 9 is an ink cartridge, the inkjet printing apparatus described with reference to FIGS. 4A and 4B is more desirable to increase the capacity for the ink to be stored in the second ink storage member 9.

Next, a position of the discharge head when the second ink storage member 9 is refilled with the ink will be described. In the state illustrated in FIG. 2, as described above, the discharge head is disposed at the lower part of each of the first ink storage member 8 and the third ink storage member 10 in the gravitational direction. In this state, the second ink storage member 9 and the discharge head are on the same side (the -y side), in a direction (the y direction) orthogonal to a conveyance direction for the printing medium of the inkjet printing apparatus 1. If the second ink storage member 9 is refilled with the ink in such a state, each of the first ink storage member 8 and the third ink storage member 10 on the respective discharge heads can also be replaced when the refilling is performed. In other words, the user can easily add the ink (refilling and replacement) at a time. Such a configuration can be implemented by, for example, scanning the position of the discharge head on the carriage, when the user refills the second ink storage member 9 with the ink (e.g., when the user inputs an instruction for refilling, or opening of the stopper member is detected by the printing apparatus). Moreover, if the second ink storage member 9 and the discharge head are on the same side, it is easy for the user to can carry out the refilling when replacing each of the first ink storage member 8 and the third ink storage member 10, i.e., the user can easily add the ink (refilling and replacement) at a time.

Meanwhile, the discharge head can be brought to the end portion on the +y side, in the state illustrated in FIG. 2. In other words, the second ink storage member 9 and the discharge head are on the opposite sides (the −y side and the +y side), in the y direction of the inkjet printing apparatus 1. If the second ink storage member 9 is refilled with the ink in such a state, the ink does not easily attach to the discharge head, the first ink storage member 8, and the third ink storage member 10, when the second ink storage member 9 is refilled with the ink. Moreover, if the second ink storage member 9 and the discharge head are on the opposite sides, for example, the user can be prevented from replacing the first ink storage member 8 or the third ink storage member 10 by mistake, when refilling the second ink storage member 9 with the ink. Similarly, the user can be prevented from carrying out the ink refilling by opening the stopper member of the second ink storage member 9 by mistake, when trying to replace the first ink storage member 8 or the third ink storage member 10. In this respect, it is desirable to make it difficult for the user to access the discharge head when the user refills the second ink storage member 9 with the ink, in both of the case where the second ink storage member 9 and the discharge head are on the same side in the y direction and the case where the second ink storage member 9 and the discharge head are on the opposite sides in the y direction. For example, it is desirable to provide such a configuration that the discharge head, the first ink storage member 8, and the third ink storage member 10 are covered with, for example, a member of the housing, when the user refills the second ink storage member 9 with the ink. Similarly, it is desirable to provide such a configuration that the second ink storage member 9 is covered with, for example, a member of the housing, when the user replaces the first ink storage member 8 or the third ink storage member 10.

Figure 6A:
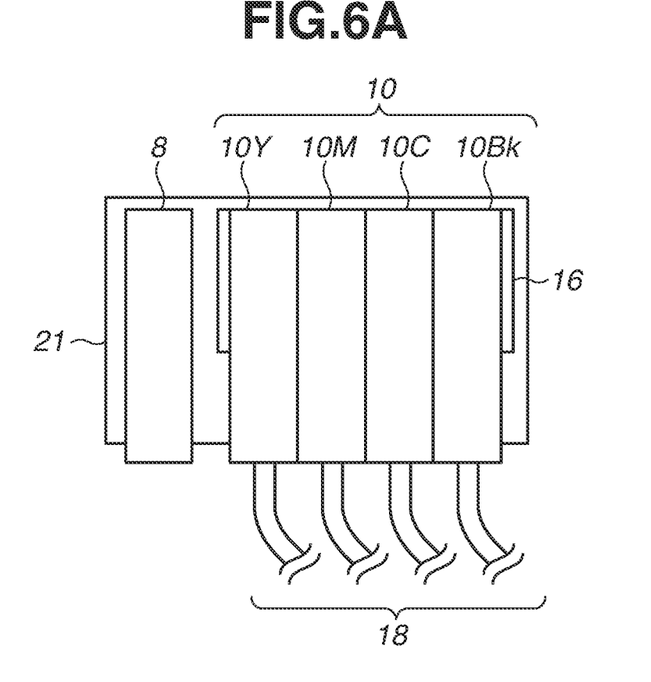
FIGS. 6A and 6B are diagrams illustrating the first ink storage member and the third ink storage member.

Another configuration of the inkjet printing apparatus will be described. FIG. 6A illustrates the ink storage members on the carriage in a manner similar to FIG. 5. Specifically, in FIG. 6A, the first ink storage member 8 and the third ink storage member 10 are provided on the carriage 21. The first ink storage member 8 is an ink cartridge not having an ink refilling port and detachable from the inkjet printing apparatus 1. The third ink storage member 10 includes four storage members 10Y, 10M, 10C, and 10Bk that store yellow ink, magenta ink, cyan ink, and black ink, respectively. The third ink storage member 10 is connected to the second ink storage member (not illustrated) within the housing 2 by the tube 18. The second ink storage member is a storage member having an ink refilling port such as the one described with reference to FIGS. 4A and 4B, and has four ink storage portions corresponding to the respective colors. The second ink storage member is provided with four ink refilling ports for the respective ink storage portions, and can be refilled with the ink for each color from an ink bottle. The first ink storage member 8 stores ink of color different from the above-described four colors. The discharge head 16 common to the storage members 10Y, 10M, 10C, and 10Bk is provided at a lower part of the third ink storage member 10 in the gravitational direction. The third ink storage member 10 and the discharge head 16 are not integral with each other, and the third ink storage member 10 can be removed for detachment/attachment or for replacement, independently of the discharge head 16. The discharge head (not illustrated) is provided at the lower part of the first ink storage member 8 in the gravitational direction as well. The discharge head at the lower part of the first ink storage member 8 in the gravitational direction is integral with the first ink storage member 8 similar to the one illustrated in FIG. 4B.

Figure 6B:
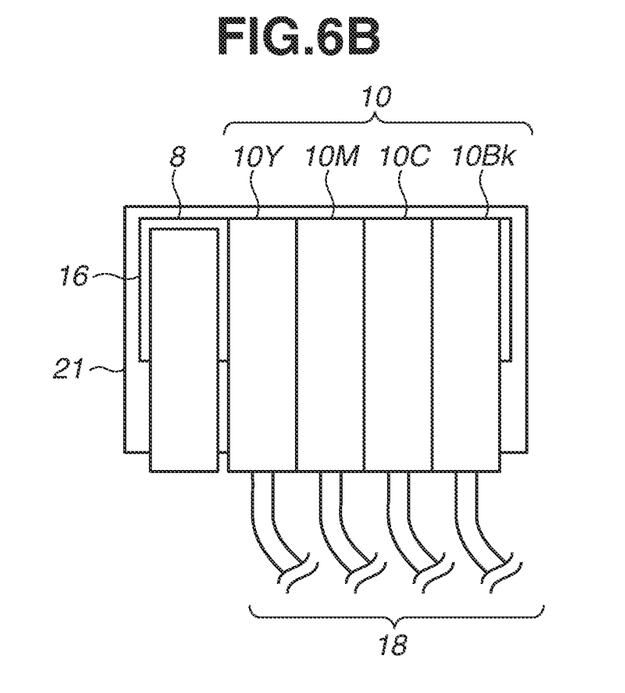

FIG. 6B illustrates a configuration basically similar to that in FIG. 6A. However, in FIG. 6B, the discharge head at the lower part of the first ink storage member 8 in the gravitational direction and the discharge head at the part lower of the third ink storage member 10 in the gravitational direction form the common discharge head 16. In this example, the first ink storage member 8 and the discharge head 16 are not integral with each other, and the first ink storage member 8 can also be removed for attachment/detachment independently of the discharge head 16, as with the third ink storage member 10. Further, the first ink storage member 8 in this example is connected to the second ink storage member (not illustrated) having a refilling port by the tube 18, as with the third ink storage member 10. Such a configuration makes the carriage 21 smaller than that in the configuration illustrated in FIG. 6A, so that the size of the entire inkjet printing apparatus is easily reduced. However, because the discharge head 16 common to the ink storage members is used, it is necessary to replace the discharge head 16 collectively including portions that discharge ink of all colors, even if replacement of the discharge head 16 is necessary for only a portion that discharges ink of a certain color.

In the configuration in FIG. 6A, the second ink storage member is omitted, but the second ink storage member is present on the right side in FIG. 6A. In other words, when viewed from the second ink storage member, the third ink storage member 10 is disposed at a closer position to the second ink storage member than the first ink storage member 8. The first ink storage member 8 is an ink cartridge, but it is necessary to provide a supply path for ink such as a tube between the second ink storage member and the third ink storage member 10, and thus evaporation of moisture from the supply path is conceivable. Therefore, the third ink storage member 10 is provided at a closer position to the second ink storage member than the first ink storage member 8, so that the distance from the second ink storage member to the third ink storage member 10 can be as short as possible. In other words, the amount of evaporation of moisture in the ink from the supply path can be small.

In the configuration illustrated in FIG. 6B as well, the second ink storage member is present on the right side in FIG. 6B. As illustrated in FIG. 6B, in a case where the first ink storage member 8 and the third ink storage member 10 are on the same discharge head 16, it is desirable to provide the third ink storage member 10 at a closer position to the second ink storage member than the first ink storage member 8, in terms of inhibition of the evaporation of the moisture.

Figure 7:
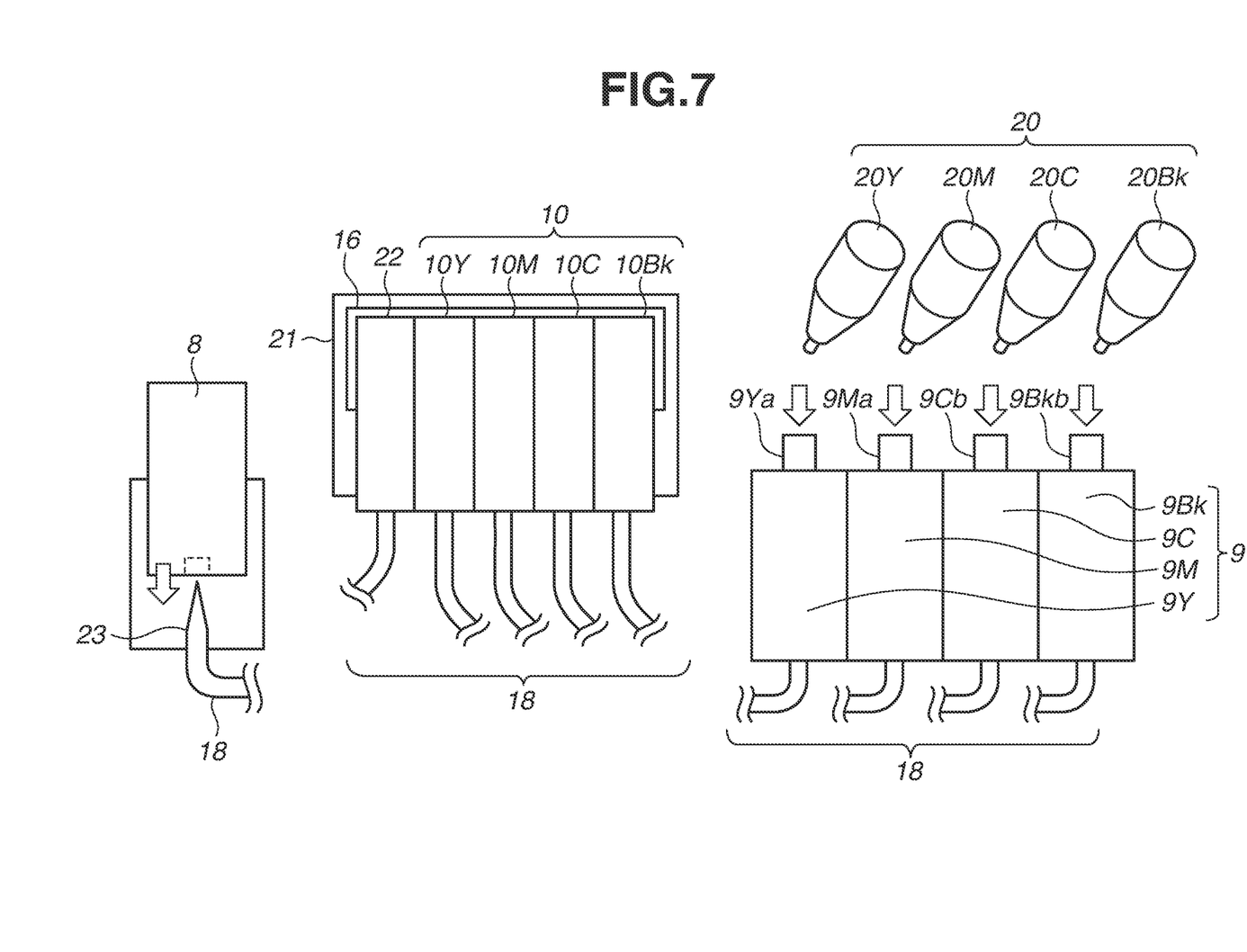
FIG. 7 is a diagram illustrating the first, second, and third ink storage members, as well as a fourth ink storage member.

Yet another configuration of the inkjet printing apparatus according to the present exemplary embodiment will be described. FIG. 7 schematically illustrates each of the ink storage members. In FIG. 7, the carriage 21 and the ink storage members on the carriage 21 are illustrated in a manner similar to FIG. 5, at a center of FIG. 7. The third ink storage member 10 and a fourth ink storage member 22 are provided on the carriage 21. The third ink storage member 10 includes the four storage members 10Y, 10M, 10C, and 10Bk that store yellow ink, magenta ink, cyan ink, and black ink, respectively. The discharge head at the lower part of the third ink storage member 10 in the gravitational direction and that of the fourth ink storage member 22 form the common discharge head 16. Each of the storage members can be detached independently of the discharge head 16. The third ink storage member 10 is connected to the second ink storage member 9 within the housing 2 by the tube 18. The second ink storage member 9 includes four storage members 9Y, 9M, 9C, and 9Bk that store yellow ink, magenta ink, cyan ink, and black ink, respectively. In other words, the storage members 10Y, 10M, 10C, and 10Bk are connected to the storage members 9Y, 9M, 9C, and 9Bk, respectively, by the respective tubes 18. The storage members 9Y, 9M, 9C, and 9Bk are provided with ink refilling ports 9Ya, 9Ma, 9Ca, and 9Bka, respectively, and can each be refilled with the ink from the ink bottle 20. The ink bottle 20 also includes four types of ink bottles 20Y, 20M, 20C, and 20Bk. The fourth ink storage member 22 is connected to the first ink storage member 8 via the tube 18. The first ink storage member 8 is also provided inside the housing 2. The first ink storage member 8 can be detached from the inkjet printing apparatus 1, by pulling out the first ink storage member 8 from a leading end portion 23 of the tube 18. In other words, the first ink storage member 8 in this example is also an ink cartridge detachable from the inkjet printing apparatus 1. Neither of the first ink storage member 8 and the fourth ink storage member 22 is provided with an ink refilling port. Therefore, evaporation of moisture from the ink can be further inhibited. According to this configuration, the first ink storage member 8 can be replaced by being detached from the inkjet printing apparatus 1, even during discharge of the ink (printing) by the discharge head 16. Although the fourth ink storage member 22 stores the ink that is hard to increase on the carriage 21, the amount of this ink can be increased in the outside of the fourth ink storage member 22, by providing the first ink storage member 8.

The ink stored in the first ink storage member and the ink stored in the second ink storage member will be described. The ink stored in each of the storage members is not limited to a particular type. However, because the first ink storage member is an ink cartridge not having an ink refilling port, and the second ink storage member is a storage member having an ink refilling port, there is ink desirable as the ink to be stored, in consideration of the characteristics of each of the storage members. This will be described in detail below.

The ink stored in the first ink storage member is first ink, and the ink stored in the second ink storage member is second ink. The first ink storage member is an ink cartridge not having an ink refilling port, and thus evaporation of moisture does not easily progress. Therefore, it is desirable for the first ink storage member to store ink that may readily affect an image to be printed due to the evaporation of the moisture. Examples of such ink include ink having a high viscosity. In the case of an ink set including a plurality of kinds of ink, it is desirable that the first ink be ink having the highest viscosity, and the second ink be ink having a viscosity lower than that of the first ink. Ink adhesion (agglomeration of the color material) of pigment ink containing a pigment as a color material more easily progresses due to evaporation of moisture than that of dye ink containing dye as a color material, and thus easily affects an image to be printed. Therefore, it is desirable that the first ink be the pigment ink, and the second ink be the dye ink, in the case of the ink set.

Further, it is desirable to provide such a configuration that ink having a high sedimentation rate of a color material is stored in an ink cartridge, so that the ink cartridge can be removed for stirring or for replacement if the color material settles. At least the first ink storage member is an ink cartridge. In a case where the second ink storage member is not an ink cartridge, the first ink is ink having a high sedimentation rate of a color material, and the second ink is ink having a lower sedimentation rate of a color material than the first ink, in the ink set. Examples of the ink having the high sedimentation rate of the color material include ink using a color material having a high specific gravity, ink using a color material having a high density, and ink using a color material having a large number average particle size. In other words, it is desirable that the first ink be ink using a color material having the highest specific gravity, ink using a color material having the highest density, or ink using a color material having the largest number average particle size, in the ink set. Examples of such first ink include white ink containing titanium oxide as a color material and metallic ink containing a colloid of gold or silver as a color material. In this case, it is desirable that the second ink be black ink or color ink (cyan, magenta, and yellow ink). Further, in a case where such ink having the high sedimentation rate of the color material is used as the first ink, it is desirable to provide a stirring mechanism (e.g., a stirring plate) for stirring the ink, in the ink storage portion of the first ink storage member.

One type of inkjet printing apparatus adds a reactant that reacts with cyan, magenta, yellow, and black ink, before or after applying the ink to a printing medium. The reactant has the property of agglomerating a color material in the ink and can improve fixability of a printed image. The amount of consumption of such a reactant is large, and thus it is desirable to provide a refilling port in a storage member for storing the reactant. Moreover, the reactant is generally colorless, and has a less serious issue concerning evaporation. Therefore, it is desirable to store the reactant in a storage member having a refilling port (the second ink storage member), and store ordinary ink of color such as cyan, magenta, yellow, and black ink in a storage member not having a refilling port (the first ink storage member). The second ink storage member that stores the reactant may have a configuration for supplying the reactant to an application member different from the discharge head such as an application roller, instead of the discharge head.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-072551, filed Apr. 5, 2019, which is hereby incorporated by reference herein in its entirety.

What is claimed is:

1. An inkjet printing apparatus comprising:
a plurality of discharge heads that discharges ink; and
a housing that contains the plurality of discharge heads,
wherein the housing contains a first ink storage member and a second ink storage member that each store ink, and the ink is supplied from each of the first ink storage member and the second ink storage member to the plurality of discharge heads, and the ink stored in the second ink storage member is different in type from the ink stored in the first ink storage member,
wherein the first ink storage member is an ink cartridge not having an ink refilling port for enabling ink refilling by opening a stopper member, and detachable from the inkjet printing apparatus, and at least one of the plurality of discharge heads is attached to the first ink storage member, and
wherein the second ink storage member has the ink refilling port, and the second ink storage member is located at a distance from the plurality of discharge heads.

2. The inkjet printing apparatus according to claim 1, wherein the inkjet printing apparatus is capable of performing printing in a state where the first ink storage member is removed.

3. The inkjet printing apparatus according to claim 2, wherein a member different from the first ink storage member is disposed in an area where the first ink storage member is disposed, when recording is performed in a state where the first ink storage member is removed.

4. The inkjet printing apparatus according to claim 1, further comprising a third ink storage member not having an ink refilling port,
wherein the ink is supplied from the second ink storage member to the third ink storage member, and further supplied from the third ink storage member to the discharge head.

5. The inkjet printing apparatus according to claim 4, wherein the second ink storage member and the third ink storage member are connected by a tube.

6. The inkjet printing apparatus according to claim 4, wherein the discharge head is disposed at a lower part of the first ink storage member and the third ink storage member in a gravitational direction.

7. The inkjet printing apparatus according to claim 4, wherein the third ink storage member and the discharge head are integral with each other.

8. The inkjet printing apparatus according to claim 4, wherein the third ink storage member and the discharge head are not integral with each other.

9. The inkjet printing apparatus according to claim 8, wherein the discharge head disposed at a lower part of the first ink storage member in a gravitational direction and the discharge head disposed at a lower part of the third ink storage member in the gravitational direction form a common discharge head.

10. The inkjet printing apparatus according to claim 4, wherein the third ink storage member is disposed at a closer position to the second ink storage member than the first ink storage member.

11. The inkjet printing apparatus according to claim 1, wherein the discharge head is disposed at a lower part of the first ink storage member and the second ink storage member in a gravitational direction.

12. The inkjet printing apparatus according to claim 1, wherein the second ink storage member and the discharge head are located on a same side in a direction orthogonal to a conveyance direction for a printing medium of the inkjet printing apparatus, in refilling the second ink storage member with ink.

13. The inkjet printing apparatus according to claim 1, wherein the second ink storage member and the discharge head are located on opposite sides in a direction orthogonal to a conveyance direction for a printing medium of the inkjet printing apparatus, in refilling the second ink storage member with ink.

14. The inkjet printing apparatus according to claim 1, wherein the second ink storage member and the discharge head are located on a same side in a direction orthogonal to a conveyance direction for a printing medium of the inkjet printing apparatus, in replacing the first ink storage member.

15. The inkjet printing apparatus according to claim 1, wherein the second ink storage member and the discharge head are located on opposite sides in a direction orthogonal to a conveyance direction for a printing medium of the inkjet printing apparatus, in replacing the first ink storage member.

16. The inkjet printing apparatus according to claim 1, wherein the first ink storage member is covered with the housing, in refilling the second ink storage member with ink.

17. The inkjet printing apparatus according to claim 1, wherein black ink is stored in the first ink storage member, and color ink is stored in the second ink storage member.

18. The inkjet printing apparatus according to claim 1, wherein among a plurality of types of ink, ink having a highest viscosity is stored in the first ink storage member, and ink having a viscosity lower than the viscosity of the ink stored in the first ink storage member is stored in the second ink storage member.

19. The inkjet printing apparatus according to claim 1, wherein pigment ink is stored in the first ink storage member, and dye ink is stored in the second ink storage member.

20. The inkjet printing apparatus according to claim 1, wherein white ink or metallic ink is stored in the first ink storage member, and black ink or color ink is stored in the second ink storage member.

* * * * *